United States Patent [19]

Combe et al.

[11] 4,083,779

[45] Apr. 11, 1978

[54] PROCESS FOR TREATMENT OF ANTHOCYANE EXTRACTS

[75] Inventors: Pierre Combe; Jean Ladet, both of Bagnols-sur-Ceze, France

[73] Assignee: S.E.F.C.A.L. Societe d'Etudes, de Fabrication et de Commercialisation de Colorants Alimentaires, Saint Julien de Peyrolas, France

[21] Appl. No.: 707,409

[22] Filed: Jul. 21, 1976

[30] Foreign Application Priority Data

Jul. 22, 1975 France .................................. 75 22854

[51] Int. Cl.² .............................................. B01D 13/00
[52] U.S. Cl. .............................. 210/23 H; 210/433 M; 210/23 F; 426/15; 426/495
[58] Field of Search ............... 426/15, 495; 210/23 H, 210/23 F, 321 R, 433 M

[56] References Cited

U.S. PATENT DOCUMENTS 3,052,546 9/1962 Riddell et al. .......................... 426/15
3,988,486 10/1976 Rhein ..................................... 426/495

FOREIGN PATENT DOCUMENTS 2,339,206 6/1975 Germany .............................. 426/15

OTHER PUBLICATIONS

Merson et al., "Reverse Osmosis for Food Processing," from a paper presented at Bristol, England, pp. 179–190 relied on.

Primary Examiner—Frank A. Spear, Jr.
Attorney, Agent, or Firm—Burgess, Dinklage & Sprung

[57] ABSTRACT

A method of treatment of an anthocyanic extract, characterized in that it mainly comprises an ultrafiltration stage which consists in separating from said extract by ultrafiltration, on the one hand a liquid filtrate which passes through an ultrafilter membrane and on the other hand a first concentrate containing more condensed forms of anthocyanins, and a reverse osmosis stage which consists in separating from said filtrate by reverse osmosis, on the one hand a diffusate which passes through a reverse osmosis membrane and on the other hand a second concentrate which contains less condensed forms of anthocyanins.

12 Claims, 1 Drawing Figure

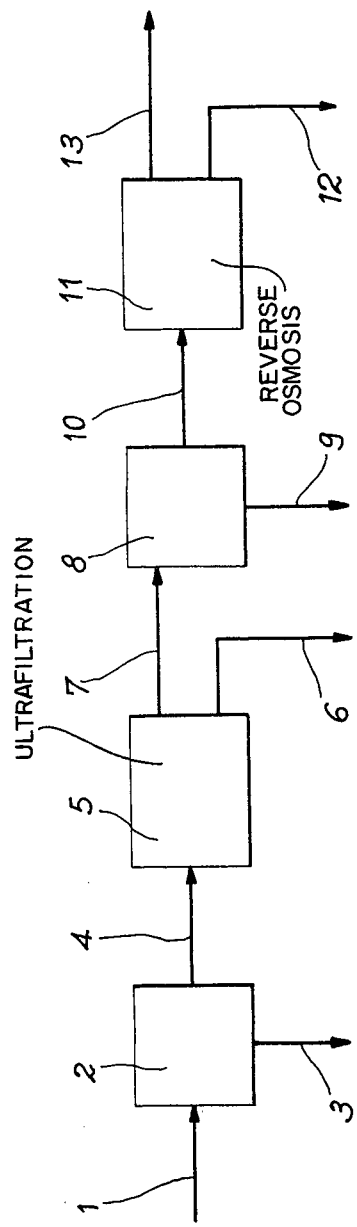

PROCESS FOR TREATMENT OF ANTHOCYANE EXTRACTS

BACKGROUND OF THE INVENTION

1. Field of the Invention

This invention relates to the treatment of aqueous liquids for separation and fractionation of polyphenolic compounds such as the anthocyanins which they may contain. The liquids thus treated can be designated as anthocyanic extracts. These extracts are usually produced from various vegetable substances including in particular fruits and by-products of fruits, the extraction being carried out by contacting with water to which one or a number of extractants are added.

2. Discussion of the Prior Art

In conventional techniques, the aqueous extract containing the anthocyanins is commonly subjected to a treatment involving concentration of anthocyanins which is carried out by evaporation of the water. A treatment of this type entails the need for a temperature rise which is detrimental to the quality of the concentrated extract obtained and especially to its composition. Moreover, since the applications of anthocyanins are mainly to be found in the field of food products in which they are employed in particular as coloring agents, purification of the extract is necessary. This purification is carried out in a conventional manner by adding chemical substances which facilitate the precipitation of impurities or by adsorption of these latter on ion exchange resins. These chemical treatments are liable not only to contaminate the final product but also to degrade or to modify the natural anthocyanins to the same extent as heat treatments.

The aim of the invention is to overcome these disadvantages by means of a novel method of treatment of anthocyanic extracts which makes it possible to carry out both the concentration and the purification of anthocyanins without having recourse to excessive heat build-up and without making use of chemical agents which are foreign to the product. This method has a further advantage in that fractionation of the anthocyanins is also ensured.

SUMMARY OF THE INVENTION

The method in accordance with the invention comprises at least one ultrafiltration stage and preferably at least one reverse osmosis stage combined with an ultrafiltration stage which precedes this latter. A method in accordance with the invention can accordingly be distinguished by the fact that it mainly comprises an ultrafiltration stage which consists in separating from said extract by ultrafiltration, on the one hand a liquid filtrate which passes through an ultrafilter membrane and on the other hand a first concentrate containing more condensed forms of anthocyanins, and a reverse osmosis stage which consists in separating from said filtrate by reverse osmosis, on the one hand a diffusate which passes through a reverse osmosis membrane and on the other hand a second concentrate which contains less condensed forms of anthocyanins. The first concentrate can constitute a food coloring agent having a high coloring power whereas the second concentrate can be reserved for other chemical or parachemical applications by reason of its high purity.

The techniques of reverse osmosis and ultrafiltration are well known per se. Although in both cases they entail the need for application of hydrostatic pressure to the liquid which is brought into contact with a membrane, these two techniques are undoubtedly different. Their differences lie especially in the nature of the membranes, their operation and the operating pressure. Ultrafiltration is essentially a method of filtration which consists in passing a liquid through a porous membrane, the pores being of sufficiently small size to ensure that the membrane retains molecules dissolved in the liquid. The criterion of operation lies in the molecular weight of the smallest molecules retained, this being dependent on the pore sizes of the membrane. The applied pressure accelerates filtration without producing any appreciable influence on the quality of separation. On the contrary, the process of reverse osmosis is based on the diffusion phenomena which takes place at the point of existence of a concentration gradient between a solution and its solvent or between two solutions having different concentrations. Use is made of a semipermeable membrane which permits selective passage of the solvent and there is applied to the solution a hydrostatic pressure of sufficient value to overcome the osmotic pressure resulting from the difference in concentrations on each side of the membrane.

The method in accordance with the invention can be applied to the treatment of all types of anthocyanic extracts. As in the case of natural extracts obtained from fruits or by-products of fruits, said anthocyanic extracts are usually in an aqueous medium but it must be understood in this case that this expression includes mixtures of water with another solvent such as alcohol and that this does not exclude the presence of various compounds in solution or in suspension. Such compounds can be obtained for example from residues of extractants or of substances extracted with anthocyanins such as other glucides, gums, pectins, or tartrates or other salts or esters of organic acids.

Moreover, the method in accordance with the invention is more especially advantageous for the treatment of anthocyanic extracts obtained from grapes and products derived from grapes, especially must or juice, wine, liquid by-products of wine-making and more particularly the marc of grapes.

In accordance with a further characteristic feature of the invention, the treated anthocyanic extract is an extract in a water-alcohol medium such as those which can be obtained from distillery marcs derived from fermentation such as that of grapes, especially by washing of marcs in counterflow to water in the presence of sulphurous anhydride; this latter constitutes an extractant and is advantageously added at an intermediate stage of the countercurrent exchange process. The anthocyanins are then extracted at the same time as the residual alcohol of the marcs. Heating at a temperature which can be of the order of 45° C or 75° C for example at the end of the extraction assists the extraction of anthocyanins and also the extraction of tartrates and of various constituents of the marcs which are thus recovered and are again present in the anthocyanic extract obtained in a water-alcohol medium.

The method in accordance with the invention preferably comprises, and especially but not in any limiting sense within the scope of the previous application, one or a number of stages of settling and separation of any precipitates which make it possible to remove the tartrates from the liquid anthocyanic extract. A separation of this type is advantageously carried out on the raw extract prior to reverse osmosis. In the event that ultrafiltration is combined with reverse osmosis in the method according to the invention, the above-mentioned separation process is preferably carried out in two stages, namely on the one hand prior to ultrafiltration and on the other hand after ultrafiltration on the filtrate. In each case, precipitation of the tartrates can be promoted by cooling the liquid to a temperature which is preferably in the vicinity of the freezing point of the mixture.

In the method according to the invention, ultrafiltration can advantageously be carried out by making use of membranes characterized by cut-off points located approximately between 1000 and 70,000 (molecular weight) and employed in the ultrafiltration process by applying hydrostatic pressures of the order of 2 to 40 kg/cm$^2$ to the treated extract. The best results appear to be obtained with membranes having a cut-off point of the order of 20,000 employed at a pressure of the order of 10 kg/cm$^2$.

In the case of the reverse osmosis of the method according to the invention, all membranes which achieve the requisite standard for reverse osmosis such as those which are usually recommended for desalination of sea water can be employed. Preference is nevertheless given to semipermeable membranes characterized by powers of retention ranging from 30 to 99% and preferably from 50 to 90% in the case of NaCl, from 70 to 99.8% and preferably from 75 to 99.7% in the case of CaCl$_2$ and in some cases by powers of retention of the order of 90 to 100% in the case of sugars. The best results appear to be obtained in the case of membranes having characteristics of the order of 85% of retention in the case of NaCl and 99.5% of retention in the case of CaCl$_2$. The operating pressures applied in the case of reverse osmosis are advantageously within the range of 10 to 100 kg/cm$^2$ and preferably of the order of 50 kg/cm$^2$.

Each concentrate but especially said first concentrate or ultrafiltration concentrate can advantageously be dried in the form of powder.

The materials necessary for carrying out the different individual stages of the method and especially those employed for supporting the membranes for ultrafiltration and reverse osmosis in order to circulate the liquids to be treated in contact with these latter, in order to establish operating pressures or in order to collect the filtrate or diffusate which passes through the membranes are conventional per se and commercially available. There is therefore no need to describe them in detail.

BRIEF DESCRIPTION OF DRAWING

One particular example of application of the invention will now be more fully described without any limitation being implied, reference being made to the flow diagram of the single accompanying FIGURE.

EXAMPLE

The anthocyanic extract to be treated, which is admitted into the installation at I, is an extract in a water-alcohol medium obtained from marcs of grapes by extraction in the presence of sulphurous anhydride. The extract contains not only more or less condensed anthocyanins but also gums and pectins, sugars, salts dissolved in water and especially salified organic acids, mainly in the form of tartrates, the proportion of which is higher if the extraction has been carried out partly in the hot state, for example at a temperature of the order 55° to 75° C at the end of the extraction process.

The raw extract aforesaid is subjected at 2 to a static settling process followed by filtration of the precipitate which is formed and contains a large proportion of the tartrates as well as various substances in suspension. The precipitate is collected at 3 after separation from the extract.

The extract is then admitted at 4 into an ultrafiltration device 5. This operation makes is possible to retain the condensed forms of anthocyanins and the other constituents having a high molecular weight, namely in particular the gums, pectins and polysaccharides which are again present in the ultrafiltration concentrate at 6. This concentrate is a liquid having a high coloring power. It has the advantage of being freed by ultrafiltration from sugars such as glucose and fructose as well as certain polyhydric alcohols such as glycerol which usually prevent drying of the coloring agents produced from marcs of fruits, especially when they are derived from fermentation as in the present instance. Moreover, when the treated raw extract contains sulphurous anhydride, this latter does not unduly affect the composition of the concentrate since it is largely removed in the form of chemical combinations with the sugars.

The ultrafiltration concentrate obtained at 6 is advantageously dried, for example by drying in vacuo at 50° C. A dry powder which does not rehydrate in air is thus obtained without entailing any need to add a support. This powder constitutes a first-class coloring agent for the food industry.

The filtrate which has passed through the ultrafilter membranes is also collected at 7. It contains especially the monomeric or only slightly condensed forms of anthocyanins, tartaric acid, sugars and mineral substances. The filtrate is cooled at 8 to a temperature of 4° C in order to induce precipitation of the tartaric acid in the form of tartrates. The precipitate which is relatively little colored is separated by centrifugation and removed at 9.

At 10, the ultrafiltration filtrate thus freed of tartrates is admitted into a reverse osmosis device 11. This latter makes it possible to retain all the anthocyanins which are present in a concentrated form in the concentrate obtained at 12 together with the sugars. This reverse osmosis concentrate is rich in monomeric and slightly condensed forms of anthocyanins and has a high degree of purity, thus constituting an advantage in various applications such as food products, chemical products and pharmaceutical products. The concentrate can be employed in particular as a coloring agent in the pharmaceutical industry. In order to facilitate drying, it may prove advantageous in some cases to employ osmosis membranes which are permeable to sugars in contradistinction to the arrangements contemplated in the particular embodiment hereinabove described. In the event that the intermediate precipitation stage at 8 is suppressed by way of alternative, the organic acids such as tartaric acid are also retained by the reverse osmosis membrane. The diffusate obtained at 13 is therefore a pure liquid consisting of water and alcohol (ethyl alcohol) and of a few dissolved salts. It can also contain a small quantity of free sulphurous anhydride but in a very small proportion since practically the entire quantity is retained with the sugars. A further advantage of the method lies in the fact that the alcohol is entirely present again in the diffusate.

The installation which has just been described is therefore advantageously integrated with a unit for the recovery of alcohol from distillery marcs obtained from fermentation. A distillation of the complete reverse osmosis diffusate then completes the installation in order to carry out this recovery.

In one example of execution, the process of ultrafiltration and reverse osmosis is carried out by means of 5 laboratory modules of the type designated as 20-0,36 LAB manufactured by the DDS Company (DE DANSKE SUKKER FABRIKER — Driftternisk Laboratorium — DK 4900 Nakskov Denmark) and having the following characteristic features:

the possibility of fitting 20 membranes each having a diameter of 20 cm
total filtration surface: 0.36 m²
simultaneous operation with several types of membranes on the same module.

The characteristics of the membranes employed, as commercialized by the same Company, are as follows:

| Type | Retention | | | MW(1) | P max(2) Kg/cm² |
|------|-----------|-----------|----------|-------|-----------------|
|      | % NaCl | % CaCl$_2$ | % Sugars |       |                 |
| Ultrafil. | (600 | 0 | — | — | 20000 | 15 |
|      | (800 | 3 | — | 10(Saccharose) | 6000 | 20 |
| Reverse | (870 | 55 | 75 | 90(Raffinose) | 500 | 50 |
| osmosis | (930 | 30 | 85 | 90(Raffinose) | 500 | 30 |
|      | (985 | 85 | 99.5 | 100(Saccharose) | 200 | 50 |

(1)MW = molecular weight of cut-off
(2)P max = maximum utilization pressure

The following table indicates in a particular case the properties of the liquids obtained at the different points of the installation by making use of a type-600 membrane for the ultrafiltration and a type-985 membrane for reverse osmosis:

|  | Anthocyanins OD³ | Coloring power 1% E 1 cm(4) |  |
|--|------------------|------------------------------|--|
| Treated anthocyanic extract | 7.150 | 0.488 | Polymeric and slightly condensed forms |
| Ultrafiltration concentrate | 15.020 | 1.090 | High proportion of polymeric forms |
| Ultrafiltration filtrate | 2.060 | 0.070 | High proportion of polymeric forms |
| Reverse osmosis concentrate | 7.400 | 0.248 | No condensed forms |
| Diffusate | 0.000 | 0.000 |  |

(3)Difference in optical density measured by decolorization with sodium bisulphite (Ribereau - Gayon and Stonestreet method) and expressed in g/l of monoglucosides of malvidol.
(4)Optical density measured in a buffer solution of sodium citrate/citric acid havig a pH of 3 in the case of a solution containing 1 % of coloring agent and a thickness traversed of 1 cm.

The recorded flow rates were:
Ultrafiltration: 350 l/m²/day
Reverse osmosis: 320 l/m²/day.

The invention is clearly not limited to the modes of execution which have been more especially described not extends on the contrary to all alternative forms. It is advantageous in particular to treat the liquid concentrates in order to separate the substances which precipitate as a result of the change in physico-chemical equilibria resulting from the concentration. Moreover, the treatment of these concentrates by vacuum evaporation can prove advantageous for concentrating them further to higher percentages of dry substances and for recovering the traces of alcohol which they could contain, if necessary prior to complete drying to the state of powder.

What is claimed is:

1. A method of treatment of an anthocyanic extract consisting essentially of an ultrafiltration stage which consists essentially of separating from said extract by ultrafiltration a liquid filtrate which passes through an ultrafilter membrane and a first concentrate containing more condensed forms of anthocyanins, which first concentrate is collected as a first dryable coloring agent, and a reverse osmosis stage consisting essentially of separating from said liquid filtrate by reverse osmosis a diffusate which passes through a reverse osmosis membrane and a second concentrate which contains less condensed forms of anthocyanins and collecting said second concentrate as a second coloring agent.

2. A method in accordance with claim 1, wherein said anthocyanic extract is an extract produced from grapes.

3. A method in accordance with claim 1, characterized in that the anthocyanic extract is in a water-alcohol medium.

4. A method in accordance with claim 3, characterized in that the treated extract is obtained from fermentation grape marcs.

5. A method in accordance with claim 1, wherein said first concentrate from said ultrafiltration stage is subsequently dried in the form of a powder.

6. A method in accordance with claim 1, further comprising at least one precipitation stage of any tartrates present in said extract wherein said tartrates are precipitated prior to reverse osmosis and the formed precipitate is eliminated.

7. A method in accordance with claim 6, characterized in that the separation of the tartrates is carried out in two precipitation stages respectively prior to and after ultrafiltration.

8. A method in accordance with claim 1, characterized in that the ultrafiltration membrane has a cutoff point within the range of 1000 to 70,000 (molecular weight), ultrafiltration is carried out at a pressure from 2 to 40 kg/cm², the reverse osmosis membrane has powers of retention ranging from 30 to 99% for NaCl, from 70 to 99.8% for CaCl$_2$, and reverse osmosis is carried out at a pressure from 10 to 100 kg/cm².

9. A method in accordance with claim 8, characterized in that ultrafiltration is carried out at a pressure of the order of 15 kg/cm².

10. A method in accordance with claim 8, characterized in that the reverse osmosis membrane has powers of retention ranging from 50 to 90% in the case of NaCl, and from 75 to 99.7% in the case of CaCl$_2$.

11. A method in accordance with claim 8, characterized in that the characteristics of the reverse osmosis membrane are of the order of 85% retention in the case of NaCl, 99.5% retention in the case of CaCl$_2$, 100% retention in the case of saccharose, and the reverse osmosis is carried out at a pressure of the order of 50 kg/cm².

12. A method in accordance with claim 1, wherein said extract is produced from a fermentation marc and further comprising a recovery of alcohol by distillation of the reverse osmosis diffusate.

* * * * *

UNITED STATES PATENT AND TRADEMARK OFFICE
CERTIFICATE OF CORRECTION

PATENT NO. : 4,083,779
DATED : April 11, 1978
INVENTOR(S) : Pierre Combe et al.

It is certified that error appears in the above-identified patent and that said Letters Patent are hereby corrected as shown below:

Column 5, line 48, "havig" should be -- having --.

Column 5, line 56, "not" should read -- but --.

*Signed and Sealed this*

*Fifteenth* Day of *August 1978*

[SEAL]

Attest:

RUTH C. MASON
*Attesting Officer*

DONALD W. BANNER
*Commissioner of Patents and Trademarks*